(No Model.)
J. T. WARING.
MACHINERY FOR FELTING HAT BODIES AND OTHER ARTICLES.
No. 326,608. Patented Sept. 22, 1885.
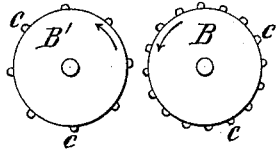
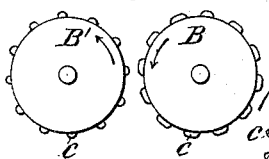
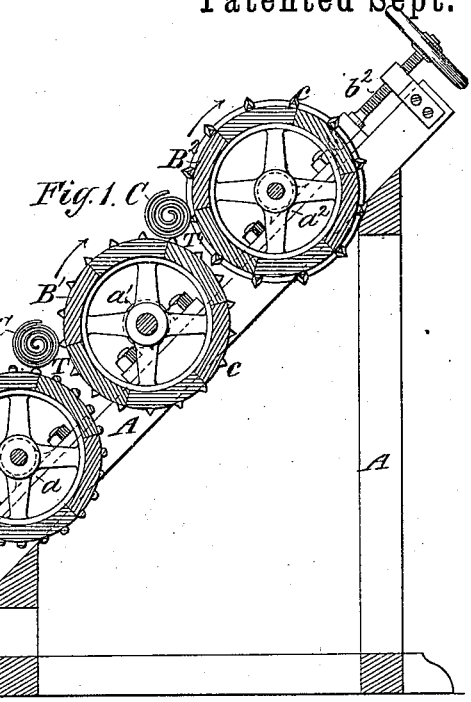
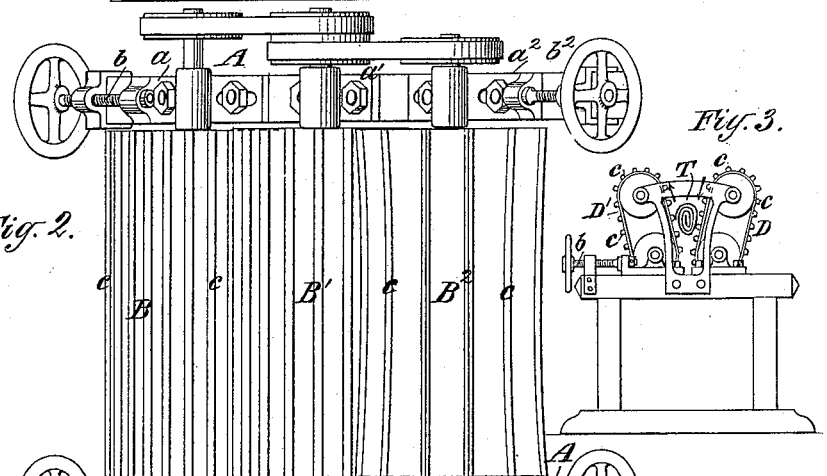
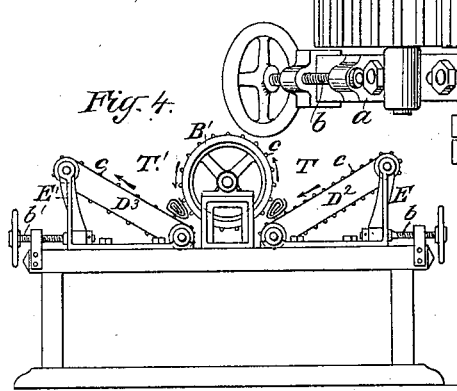
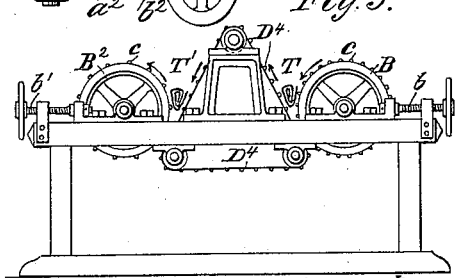
Witnesses:
Matthew Pollock
Francis Kiernan
Inventor:
John T. Waring
by his attorneys
Brown & Hall
N. PETERS. Photo-Lithographer, Washington, D. C.

UNITED STATES PATENT OFFICE.

JOHN T. WARING, OF YONKERS, NEW YORK.

MACHINERY FOR FELTING HAT-BODIES AND OTHER ARTICLES.

SPECIFICATION forming part of Letters Patent No. 326,608, dated September 22, 1885.

Application filed December 26, 1884. (No model.)

*To all whom it may concern:*

Be it known that I, JOHN T. WARING, a citizen of the United States, residing at Yonkers, in the county of Westchester and State of New York, have invented a new and useful Improvement in Machinery for Felting Hat-Bodies and other Articles, of which the following is a specification, reference being had to the accompanying drawings.

This invention is applicable to that kind of felting-machine which is the subject-matter of Letters Patent No. 227,329, granted to me on the 4th day of May, 1880, and the principal working parts of which are rollers arranged parallel with each other, so as to form between them an open trough or trough-like or hopper-like cavity, in which a roll of hat-bodies or other articles to be felted is placed and subjected to a rolling motion by the rotation of the said rollers in opposite directions. The invention is also for the most part applicable to machines in which a similar trough-like cavity is formed by the combination of a roller and an endless apron, as described in my application for Letters Patent, Serial No. 147,814, filed November 13, 1884, and it is further for the most part applicable to machines in which a similar trough or trough-like cavity is formed by the combination of endless aprons, as described in my application for Letters Patent, Serial No. 148,493, filed November 21, 1884.

The invention consists in the novel construction of the working-surfaces of all such machines, in means of adjustment of the rollers and aprons of such machines, and in the novel arrangement of rollers in such machines, all as hereinafter described and claimed.

Figure 1 in the drawings is a vertical section of a machine, the principal working parts of which are three rollers, and which illustrates all the features of my invention. Fig. 2 is a plan of the same. Fig. 3 is a side view of a machine, the principal working parts of which are two endless aprons, illustrating the means of adjustment, which constitutes an important feature of the invention. Figs. 4 and 5 are side views of machines. The principal working parts consist of a combination of roller and endless apron, illustrating similar means of adjustment. Fig. 6 is a diagram of two of the rollers of the machine which is shown in Figs. 1 and 2. Fig. 7 is a diagram of two rollers, illustrating a modification.

Similar letters of reference indicate corresponding parts in the several figures.

The machine shown in Figs. 1 and 2 is like that illustrated in my Letters Patent No. 227,329, hereinbefore mentioned, in that it has three parallel rollers, between which are formed two troughs or trough-like cavities, in which the rolls of hats or other articles to be felted are placed and operated upon; but this machine differs from that, inasmuch as in this the rollers are arranged one above another, instead of all at the same level. The front and back rollers are adjustable relatively to the central one, and the rollers are not all alike, but are unequally lagged.

A, Figs. 1 and 2, is the framing of the machine, upon which the journal-boxes $a$ $a'$ $a^2$ of the three rollers B B' B² are so placed that the axes of the said rollers occupy an inclined plane, or, in other words, that the said rollers are arranged one above another in such manner that the two troughs or trough-like cavities T T', formed between them, and especially the trough or cavity T', are brought within more convenient reach of the attendant, who stands in front of the machine, the front being at the left hand of Fig. 1. The rollers are represented all rotating in the same direction, as indicated by arrows in Fig. 1, and as so geared or connected by belts as to rotate at the same surface velocity. The journal-box $a'$ of the middle roller, B', is represented as fixed on the framing; but those, $a$ and $a^2$, of the front and back rollers are represented as movable back and forth, and as having applied to them adjusting-screws $b$ $b^2$, for the purpose of adjusting them toward and from $a'$, and thereby adjusting the rollers B and B² nearer to or farther from that B', to contract or widen the openings at the bottoms of the troughs or trough-like cavities T T'. The effect of the greater separation or wider adjustment is to increase the nip by allowing the roll of hat-bodies C to enter more deeply into the trough or farther in between the rollers, and so to produce a more active felting operation; and so, in starting the operation, when the hat-bodies are more tender and will not bear to be so hardly worked, the rollers may be adjusted nearer together, and then, as the felting progresses, they may be adjusted wider apart to obtain a more active operation.

The rollers are all represented as having lags or projections $c\ c$ on their peripheral working-surfaces. The roller B is represented as having the lags or projections more numerous than that B', and the latter is represented as having them more numerous than that $B^2$, the greater number being on that one of two rollers whose surface forms the descending or inwardly-moving side of the trough or trough-like cavity T or T' between those rollers, which will be understood by reference to Fig. 1, and to the arrows marked thereon, to indicate the direction of the revolution of the rollers. The effect of this greater number of lags or projections is to give one roller a greater working-surface than the other, and by that means to produce a greater activity of operation of the descending or inwardly-moving side or surface of the trough as compared with the outwardly-moving side or surface thereof, and so to produce the creeping in of one side of the roll of hat-bodies and the crowding of the roll down into the trough. This effect is the same as that described in my Letters Patent No. 227,329, as produced by giving one of the rollers a greater surface velocity as compared with its fellow. In this case the effect is or may be produced by the greater amount of working-surface without any difference of surface velocity. The unequal lagging or unequal surface projection of the rollers produced by furnishing one with a greater number of lags or projections than the other is shown in the diagram Fig. 6 more plainly than in Fig. 1.

Another method of obtaining a greater amount of lag-surface or surface projection on one roller than on the other is illustrated in Fig. 7, in which the roller B is represented of the same size and with the same number of lags $c\ c$ as that B'; but the lags of B are broader. This greater size is equivalent to greater number of the same size, and will have the same effect of making one roller more active than the other, while both have the same surface velocity.

In the machine shown in Fig. 3 the two endless aprons D D', which form the open trough or trough-like cavity T, corresponding with that formed between two of the rollers shown in Fig. 1, have their surfaces furnished with lags, the lags being more numerous on that apron, D, which constitutes the descending or inwardly-moving side of the trough than on the other one, D', which constitutes the ascending or outwardly-moving side. The more numerous lags on D and the greater lag working-surface thus produced have the same effect as the greater number of lags on the one of the two rollers, as hereinbefore described with reference to Figs. 1, 2, and 6. The same effect of greater working-surface may be produced in this machine by making the lags on one apron larger than those on the other, the number on both being the same.

The machine shown in Fig. 3 has applied to it the same kind of adjustment for the width of the bottom of the trough or trough-like cavity T as is provided in the machine shown in Figs. 1 and 2—that is to say, adjusting-screws $b$ are applied to the journal-boxes of the lower drum of the endless apron D'.

In the machine shown in Fig. 4, in which two open troughs or trough-like cavities, T T', are formed between two endless aprons, $D^2$ $D^3$, and an interposed roller, B', the surface of the aprons and of the said roller are unequally lagged, like the rollers shown in Figs. 1 and 6 and the apron shown in Fig. 3, for the same purpose of causing one side of a roll of hat-bodies placed in the trough to receive a greater action than the other, and so producing the creeping down or in of the roll. The frames E E', which support the aprons in this machine, are also adjustable by screws $b\ b'$ toward or from the roller B', for the purpose of widening or contracting the troughs, in the manner and for the purpose described with reference to Figs. 1 and 2.

The same system of unequal lagging and the same system of roller adjustment by screws $b\ b'$, as herein described with reference to Figs. 1 and 2, are also shown applied to the machine illustrated in Fig. 5, the troughs T T' and the working-surfaces of which are constituted by the two lagged rollers B $B^2$ and the interposed lagged endless apron $D^4$. The lags $c\ c$ on the rollers or aprons, or both, which constitute the working-surface of machines constructed according to this invention, may have any longitudinal form; but I prefer to make them of such curved, taper, or other form that the longitudinal profile of the rollers will be concave, and that the trough-like space provided between the rollers for the reception of the roll of hat-bodies or other materials to be felted will be wider at the middle of the length of the rollers and narrower toward the ends thereof.

In carrying out that part of my invention which consists in the unequal lagging or unequal surface projection on the rollers or aprons, or any equivalent moving bodies which constitute the sides of the open troughs or trough-like cavities T T', I do not confine myself to lags extending all along the rollers or all across the aprons; but short pieces of lagging may be employed, or any regularly or irregularly arranged system of bosses and nodules or other projections may be substituted for lags, the number or size of said lags or projections being so much greater on one of the aprons, rollers, or moving bodies than on the other as to produce a greater amount of surface projection on one and a greater activity of operation thereby, as compared with the other, as herein described.

In some cases it might be practicable to make the surface of one of the rollers, aprons, or moving bodies smooth, and the other with lags or projections, that one which constitutes the outwardly-moving side of the trough being smooth, and the other having the lags or projections to give it the greater surface.

What I claim as my invention, and desire to secure by Letters Patent, is—

1. In a felting-machine in which the working-surfaces consist of rollers arranged to form an open trough or trough-like cavity as T or T', the arrangement of the rollers one above another, substantially as and for the purpose herein described.

2. In a felting-machine, the working-surfaces of which are arranged and operated to constitute a trough or trough-like cavity, as T or T', one side of which moves in one direction and the other side in an opposite direction, the combination, with either of the said working-surfaces, of means of adjustment whereby the said trough or cavity may be widened or contracted, substantially as herein described.

3. In a felting-machine, the combination of two moving bodies which are arranged and operated to constitute an open trough or trough-like cavity, as T or T', one of the said bodies having lags or projections on its surface, whereby it is made to present a greater working-surface than the other, substantially as and for the purpose herein described.

4. In a felting-machine, the combination of two moving bodies which are arranged and operated to constitute an open trough or trough-like cavity, as T or T', the opposite sides of which move, one inward and the other outward, the said bodies both having lags or projections on their faces, and that one which constitutes the inwardly-moving side of the trough or cavity having a greater lag-surface or surface projection than the other, substantially as and for the purpose herein described.

JOHN T. WARING.

Witnesses:
MATTHEW POLLOCK,
FREDK. HAYNES.